Dec. 31, 1968　　　D. J. RYAN　　　3,419,650
METHOD FOR MAKING THERMOPLASTIC FILMS
Original Filed June 5, 1964

United States Patent Office 3,419,650
Patented Dec. 31, 1968

3,419,650
METHOD FOR MAKING THERMOPLASTIC FILMS
Daniel J. Ryan, Chester, Pa., assignor to FMC Corporation, Philadelphia, Pa., a corporation of Delaware
Original application June 5, 1964, Ser. No. 372,909, now Patent No. 3,355,768, dated Dec. 5, 1967. Divided and this application June 8, 1967, Ser. No. 644,599
6 Claims. (Cl. 264—146)

ABSTRACT OF THE DISCLOSURE

A method for making oriented films in which an extruded tubing of thermoplastic material, which is at a temperature at which the molecules thereof may be oriented by stretching, is engaged only along its internal surface by movable means which are advanced along paths and at such rates of speed as to cause the tubing to be stretched and thus oriented at least along one of its longitudinal and transverse directions.

---

Figure 1:
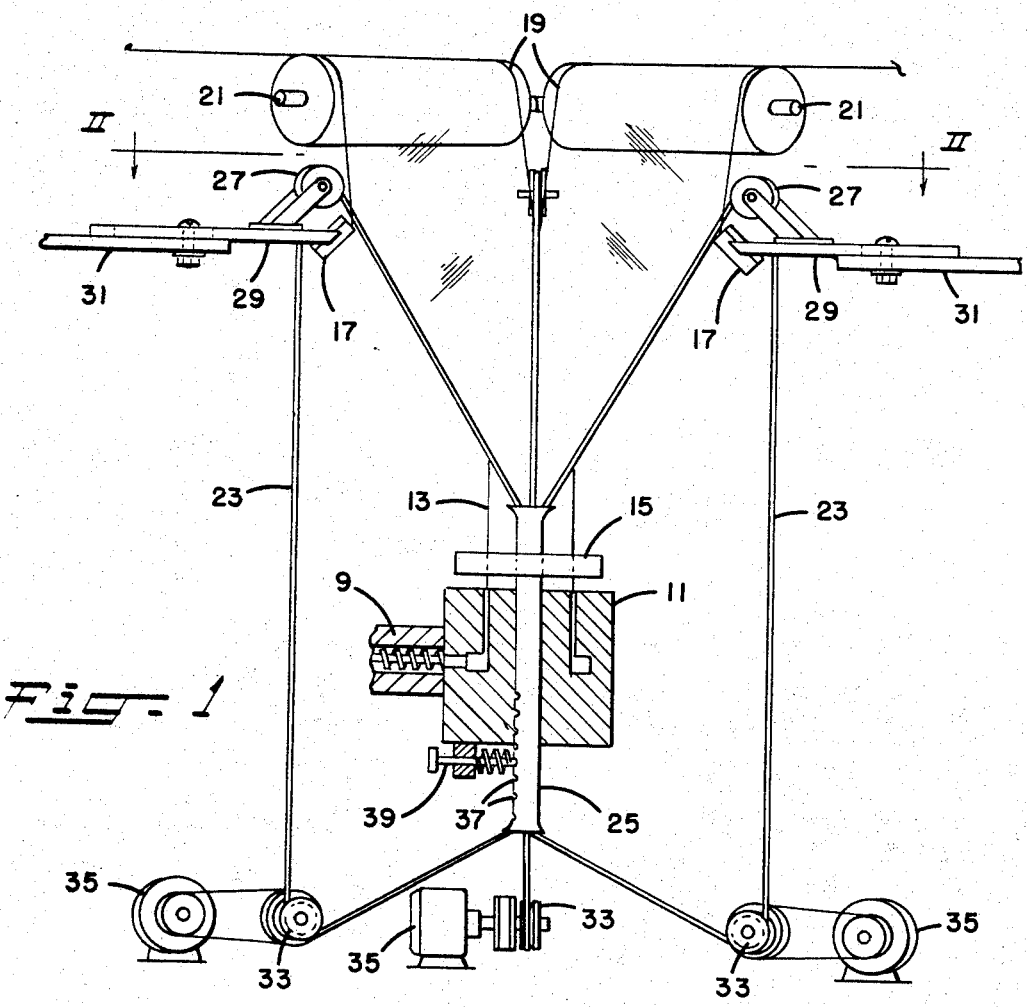

This application is a division of application Ser. No. 372,909, filed on June 5, 1964, now U.S. Patent No. 3,355,768.

This invention relates to the manufacture of films and more particularly to an improved method for making oriented films from tubing formed of thermoplastic polymeric materials.

In a conventional method of making films from tubing, a freshly extruded tubing is generally expanded by a bubble of fluid which is contained between the extrusion die and a pair of nip rolls, after which the tubing is slit into two or more films. A critical object to this and other similar procedures is that the contained bubble of fluid effects stretching of the tubing immediately as it issues from the extrusion device so that the molten and thus more yieldable portion of tubing is made thinner without providing for any appreciable degree of orientation therein. In other words, the expansive effect of the bubble of fluid is dissipated in stretching the portions of the tubing which are in a more yieldable condition but which are not capable of retaining orientation. Proposals for remedying the above-described disadvantage have been satisfactory to some degree but, in general, lack the flexibility which would permit their use with different materials and often require extremely accurate and continuous control. Accordingly, a primary object of this invention is the provision of an improved method for making oriented films from tubing formed of thermoplastic polymeric materials.

Another object is the provision of an improved and simple method for effecting a controlled uniaxial or biaxial stretching of an extruded thin-walled tubing of thermoplastic polymeric material.

Still further objects are apparent from the following description.

The objects are accomplished in accordance with the present invention by an improved method in which an extruded tubing of heated or molten thermoplastic polymeric material is cooled to a temperature range within which the thermoplastic material may be oriented by stretching, after which the internal surface of the tubing is engaged along at least two circumferentially spaced locations and then stretched at least along one of its transverse and longitudinal directions. Transverse stretching of the tubing may be achieved by directing the engaged portions thereof along diverging paths, while longitudinal stretching is best effected by advancing the engaged tubing portions at a faster rate than the rate at which the tubing is extruded. During or after stretching of the tubing, the tubing is cooled to a temperature below the orientation temperature range and is then slit into two or more films.

The apparatus employed in the method of the present invention is one in which movable means such as one reach of each of a plurality of endless cables is continuously engaged with the internal surface of a freshly extruded tubing as it issues from an annular die after which such opposing reaches are caused to travel preferably along paths which diverge relative to the tubing axis. In this manner the tubing is stretched and oriented in a transverse direction concomitantly with its advancement. At locations spaced from the annular die the oriented tubing is slit into films at the locations at which it is engaged by said movable means and the paths of the endless cables are reversed. The endless cables are led into the extruded tubing by a guide tube which extends through the extrusion die and is adjustable relative thereto so that the locations at which the cables first engage with the internal surface of the tubing may be varied. Means are provided for positively driving the endless cables whereby the tubing may be advanced at such a rate as to effect longitudinal orientation thereof alone or substantially concomitantly with its transverse stretching.

The method of the present invention is not limited for use with any particular thermoplastic polymeric materials or any specific set of operating conditions. Further, it will be apparent that the orientation imparted to the thermoplastic material may extend transversely or both transversely and longitudinally of the resulting films and that in the latter instance may but need not be balanced along both axial directions.

Figure 2:
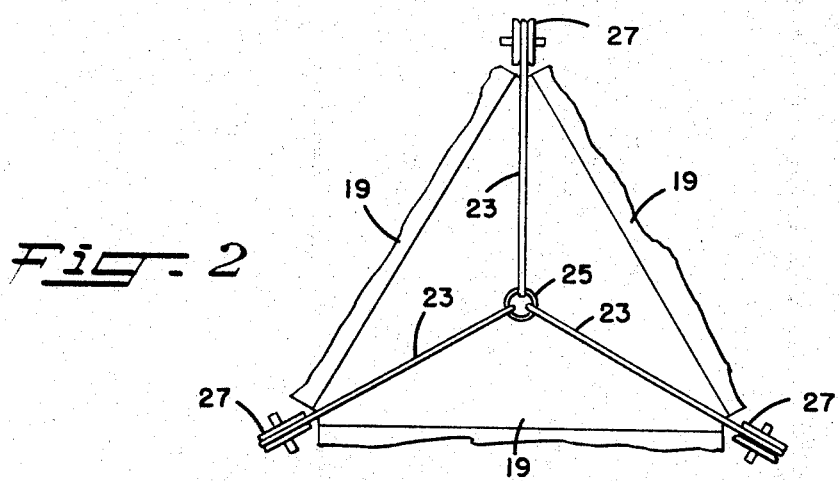

In the drawing, FIGURE 1 is a diagrammatic illustration of the apparatus employed in the method of the present invention in use; and FIGURE 2 is a transverse section taken substantially along the lines II—II of FIGURE 1.

With reference to the drawing, FIGURE 1 diagrammatically illustrates a portion of a conventional screw extruder 9 having an annular die 11 from which a molten thermoplastic polymeric material may be continuously extruded as a seamless thin-walled tubing 13. A ring 15 is provided for directing cool air or other gas against the extruded tubing 13 to chill the same to within a range of temperatures at which the particular thermoplastic may be oriented. At locations spaced from the die 11 the tubing 13 is slit by knives 17 into a plurality of films 19 which are collected upon separate take-up cores 21 driven at substantially the same rate of speed by suitable means, not shown.

The tubing 13 is stretched in a transverse direction concomitantly with its advancement by endless cables 23, with at least two, and preferably three, of such cables being employed. The opposing reaches of the endless cables 23 are led up into and through the annular extrusion die 11 by a guide tube 25 and are engaged with the internal surface of the tubing 13 as they travel along diverging paths toward and over pulleys 27. The tubing 13 is slit as it approaches the pulleys 27, with both the slitting knives 17 and the pulleys 27 being mounted on carriages 29 which are adjustably fixed to support plates 31. From the pulleys 27 the cables are laced about pulleys 33 which are all driven at substantially the same rate of speed by motor 35.

As illustrated on the drawing, the guide tube 25 is mounted for movement relative to the extrusion die 11 and is provided with recesses 37 for receiving a spring loaded retaining pin 39. The exit end of the tube 25 is widened to permit a smooth and gradual outward movement of the endless cables and, if desired, may be fitted with rollers to minimize friction.

In operation, molten thermoplastic polymeric material is delivered by the extruder 9 and is shaped into the form of the tubing 13 as it issues from the extrusion die 11. Chilled air from the ring 15 serves to cool the tubing 13 to such an extent that it is within the orientation temperature range when its internal surface is continuously engaged by the opposing reaches of the movable means, for example, endless cables 23. The temperature of the cool air delivered by the ring 15 may be varied to suit the particular polymeric material being extruded. It is preferred, however, that the temperature of the quenching air remain substantially constant and that the distance of free travel of the tubing 13 be varied by adjusting the position of the guide tube 25 relative to the die 11.

Once engaged with the internal surface of the tubing 13, the endless cables carry and stretch the same in a transverse direction until it is cut by the knives 17 into films 19.

The degree of transverse stretching may, of course, be varied by adjusting the positions of the carriages 29 radially relative to the axis of the tubing 13. The portions of the tubing with the movable means travel at substantially the same rate as that at which the tubing is extruded. Further, if desired, the motors 35 may drive the endless cables 23 and the engaged portions of the tubing 13 at a rate of speed which exceeds the rate of extrusion so as to provide for longitudinal stretching of the tubing concomitantly with its transverse orientation. Regardless of the rate at which the endless cables are advanced, no relative movement exists between the cables and the portions of the tubing engaged therewith. Additionally, it will be apparent that the separation between the endless cables 23 may be varied from the substantially equal spacing illustrated on the drawing, and that either the cable spacing and/or the position of the knives 17 may be changed to provide films 19 which are of different widths.

It is to be understood that changes and variations may be made without departing from the spirit and scope of the invention as defined in the appended claims.

I claim:

1. A method of making oriented thermoplastic film including the steps of extruding from an annular die a heated thermoplastic material in the form of a tubing, cooling the extruded tubing to within a temperature range at which molecular orientation of the thermoplastic material may be effected by stretching, while within said temperature range engaging only the internal surface of the extruded tubing at least along two circumferentially spaced locations with means adapted to move with said tubing, orienting the molecules of the thermoplastic material by directing the movable means along paths and at such rates as to cause the tubing to be stretched at least in one direction, maintaining the internal surfaces of the tubing continuously engaged with the movable means so that they travel together without relative movement therebetween, slitting the oriented tubing into at least two films, and releasing the tubing from the movable means concomitantly with the slitting thereof.

2. A method as defined in claim 1 wherein orientation of the molecules of the thermoplastic material is effected by stretching the tubing in a transverse direction as the movable means are directed along paths which diverge relative to each other.

3. A method as defined in claim 2 including the step of cooling the tubing to a temperature below the orientation temperature range of the thermoplastic material prior to slitting of the same.

4. A method as defined in claim 2 wherein said tubing is slit at the locations at which it is engaged by said movable means.

5. A method as defined in claim 2 wherein the portions of the tubing engaged with the movable means travel at substantially the same rate as that at which the tubing is extruded.

6. A method as defined in claim 2 wherein the portions of the tubing engaged with the movable means travel at a faster rate than that at which the tubing is extruded to thereby stretch and provide for orientation of the thermoplastic material in a longitudinal direction substantially concomitantly with its stretching and orientation.

References Cited

UNITED STATES PATENTS

| | | | |
|---|---|---|---|
| 2,852,813 | 9/1958 | Longstreth | 264—146 |
| 3,265,552 | 8/1966 | Berggren et al. | 264—146 X |
| 2,361,369 | 10/1944 | Grebe et al. | 264—290 X |
| 3,217,361 | 11/1965 | Ryan et al. | 18—14 |

FOREIGN PATENTS 3,715,483  9/1962  Japan.

ROBERT F. WHITE, *Primary Examiner.*

S. I. LANDSMAN, *Assistant Examiner.*

U.S. Cl. X.R.

264—209, 290